United States Patent [19]

Büttiker

[11] 4,409,716
[45] Oct. 18, 1983

[54] METHOD AND APPARATUS FOR PRODUCING A CAST WHEEL BODY

[75] Inventor: Urs Büttiker, Löhningen, Switzerland

[73] Assignee: Georg Fischer Aktiengesellschaft, Schaffhauser, Switzerland

[21] Appl. No.: 333,475

[22] Filed: Dec. 22, 1981

Related U.S. Application Data

[63] Continuation of Ser. No. 91,825, Nov. 6, 1979, abandoned.

[30] Foreign Application Priority Data

Nov. 9, 1978 [CH] Switzerland .................. 11512/78

[51] Int. Cl.³ ........................................... B21D 53/30
[52] U.S. Cl. .................................. 29/159 R; 29/527.6; 83/53; 83/267; 83/914; 72/325

[58] Field of Search ............ 29/159.03, 527.6, 159 R, 29/159.1; 301/12 R, 65; 83/53, 267, 914; 72/325

[56] References Cited
U.S. PATENT DOCUMENTS 4,230,645  10/1980  Dodson ........................... 72/327

FOREIGN PATENT DOCUMENTS 1914249  2/1970  Fed. Rep. of Germany .... 301/12 R

*Primary Examiner*—Lowell A. Larson
*Attorney, Agent, or Firm*—Toren, McGeady and Stanger

[57] ABSTRACT

A cast wheel body is formed with an angular slot for receiving a hammerhead bolt used to fasten a wheel rim to the wheel body with an angle piece cast in this slot being pushed outwardly by means of a vertically movable tool which deburs the areas where the angle piece is broken away and the adjacent walls of the wheel rim while also leveling the bolt support and compressing the wall for the bolt to a predetermined thickness.

4 Claims, 8 Drawing Figures

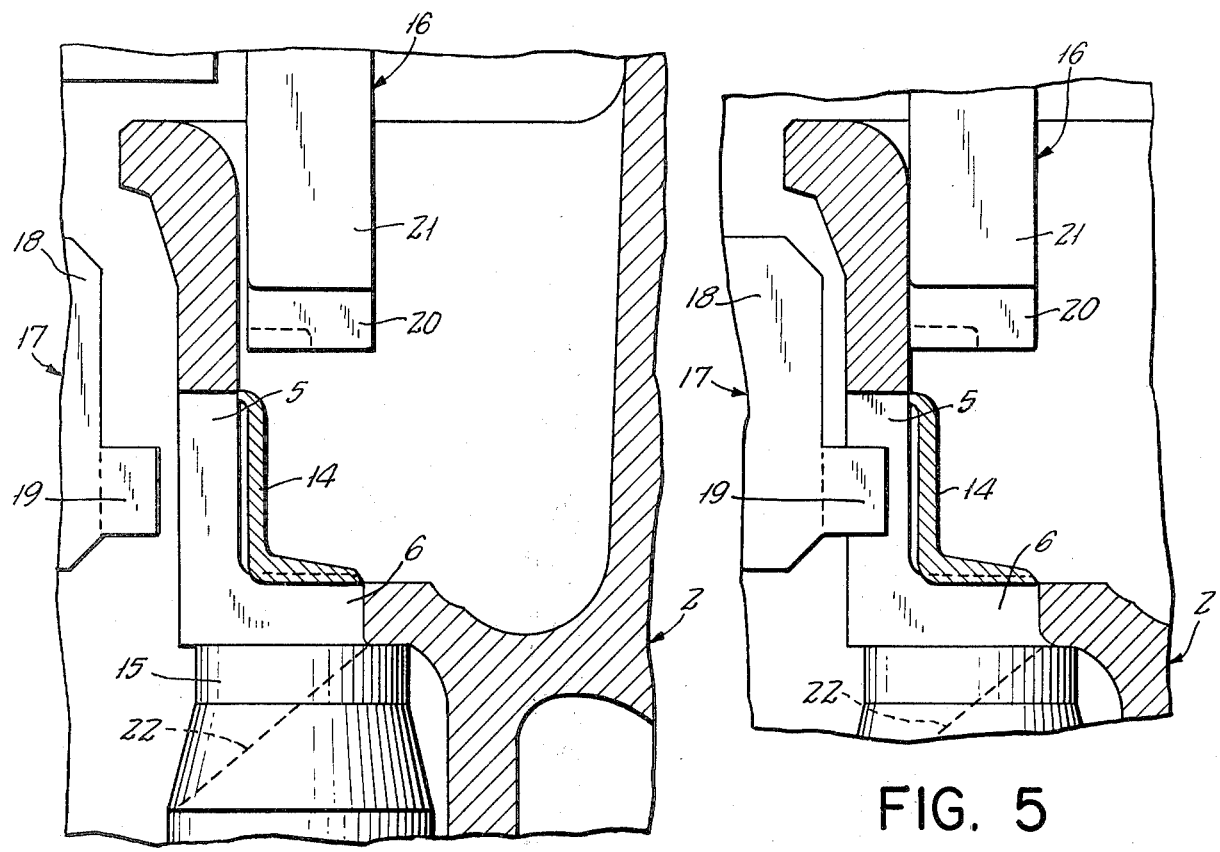
FIG. 4
FIG. 5
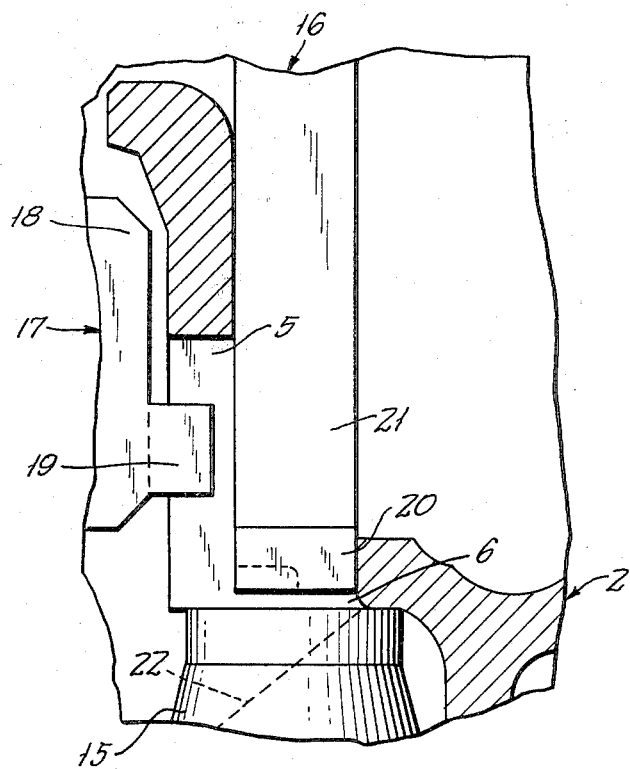
FIG. 6

METHOD AND APPARATUS FOR PRODUCING A CAST WHEEL BODY

This is a continuation of application Ser. No. 091,825, filed Nov. 6, 1979, now abandoned.

BACKGROUND OF THE INVENTION

The present invention relates generally to a method for producing a cast wheel assembly and more particularly to a method and arrangement for producing a central wheel body upon which a rim portion of the wheel assembly may be attached. The wheel body is made of iron/carbide cast material and includes spoke heads which are arranged in a distributed pattern about the wheel body. Arranged in the spoke heads are supports for hammerhead bolts which operate to fasten the wheel rim and which include bolt heads inserted from outside of the wheel body through an angular slot which extends through a wall for supporting the bolt and through a supporting wall extending approximately perpendicularly thereof. In wheels of the type to which the present invention relates, when the bolt attaching the rim portion is tightened, it is held nonrotatably against the supporting wall in the central wheel body for the bolt.

The invention further relates to apparatus for performing the method and to a wheel body produced in accordance with the method.

Wheel bodies of the type mentioned are conventionally used for heavy trucks, tractors, trailers and the like wherein at least two rims are removably fastened on the wheel body by means of bolts which are arranged in a uniformly distributed pattern on the circumference of the wheel body.

In wheel bodies a distinction is usually drawn between a wheel spider and a wheel adapter, both of which serve to receive the wheel rims. The wheel adapter is designed only for receiving the wheel rims while the spider is mounted on the wheel hub. Accordingly, with respect to operation of the wheel, the wheel spider corresponds to the wheel adapter plus the wheel hub.

Cast wheel bodies of the type described above are disclosed in the prior art for example in Swiss Pat. No. 471 695 which discloses a structure of the type which has found acceptance.

However, because of the manual labor which is required in finishing the cast wheel bodies, the production techniques become relatively cumbersome. In the finished cast wheel bodies, slots must be deburred, bolt supports must be leveled and the wall for the bolt must be reduced to a predetermined thickness.

The manual labor involved produces disadvantages in that it becomes rather difficult to perform because of the inaccessability of the areas involved. As a result such manual labor tends to be rather time-consuming. Furthermore, there becomes involved the risk that tolerances will be exceeded and that therefore significance waste will result. Because of the production costs, it has therefore been attempted to explore possibilities for improving the techniques involved in the finishing of cast wheel bodies in order to enable more precise work to be performed less expensively and with greater speed.

It is therefore a goal of the present invention to provide a method for the production of wheel bodies and apparatus for performing the method wherein improvements over existing techniques may be enabled and wherein, particularly, the production procedures may be simplified and made less expensive. The invention is directed toward eliminating the disadvantages discussed above and toward increasing the quality of the wheel body produced while simultaneously reducing the number of rejects which result.

SUMMARY OF THE INVENTION

The present invention relates to a method and apparatus for producing a wheel body of iron/carbon cast material which consists of spoke heads arranged in a distributed manner with supports arranged therein for hammerhead bolts which are used to fasten a wheel rim to the wheel body, the bolts being inserted from outside the wheel through an angular slot for the bolts which extends through a pair of perpendicular walls one of which is a supporting wall for the head of the bolt which, when tightened, is nonrotatably held against the other wall. The method of the invention particularly comprises the steps of casting the slot in the wheel body with an angle piece which may be pushed outwardly, and arranging the wheel body in apparatus including a vertically movable tool with the angle piece arranged within the path of movement of the vertically movable tool. The wheel body is then placed for processing horizontally on a rotatable sliding table having pin-shaped vertical supports provided in a number and arrangement which corresponds with the number and arrangement of the spoke heads of the wheel. The sliding table is moved toward a stationary centering device and subsequently the vertically movable tool is lowered adjacent the supporting wall almost to the level of the angle piece. A horizontally movable push member is applied against the wheel body in order to move the wheel body toward the tool and the tool is moved further downwardly in order to, first, break out the angle piece, second, debur the wall for the bolt and, third, to calibrate the wall to a specified thickness. Thereafter, the tool is moved out of the wheel body, the sliding table is retracted and rotated to a subsequent bolt head and the tool is again inserted in order to process a subsequent spoke head.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 4 is a view similar to FIG. 3 showing a partially inserted tool;

FIG. 5 is a view similar to FIG. 4 showing a further stage in the method of the invention wherein a push member is horizontally moved toward the wheel body so that the wheel body may be fixed for processing on the circumference and radially relative to the tool;

FIG. 6 is a view similar to FIG. 5 showing a further stage in the method wherein the tool is fully inserted and the angle member is ejected.

DETAILED DESCRIPTION OF THE PREFERRED EMBODIMENT

Figure 8:
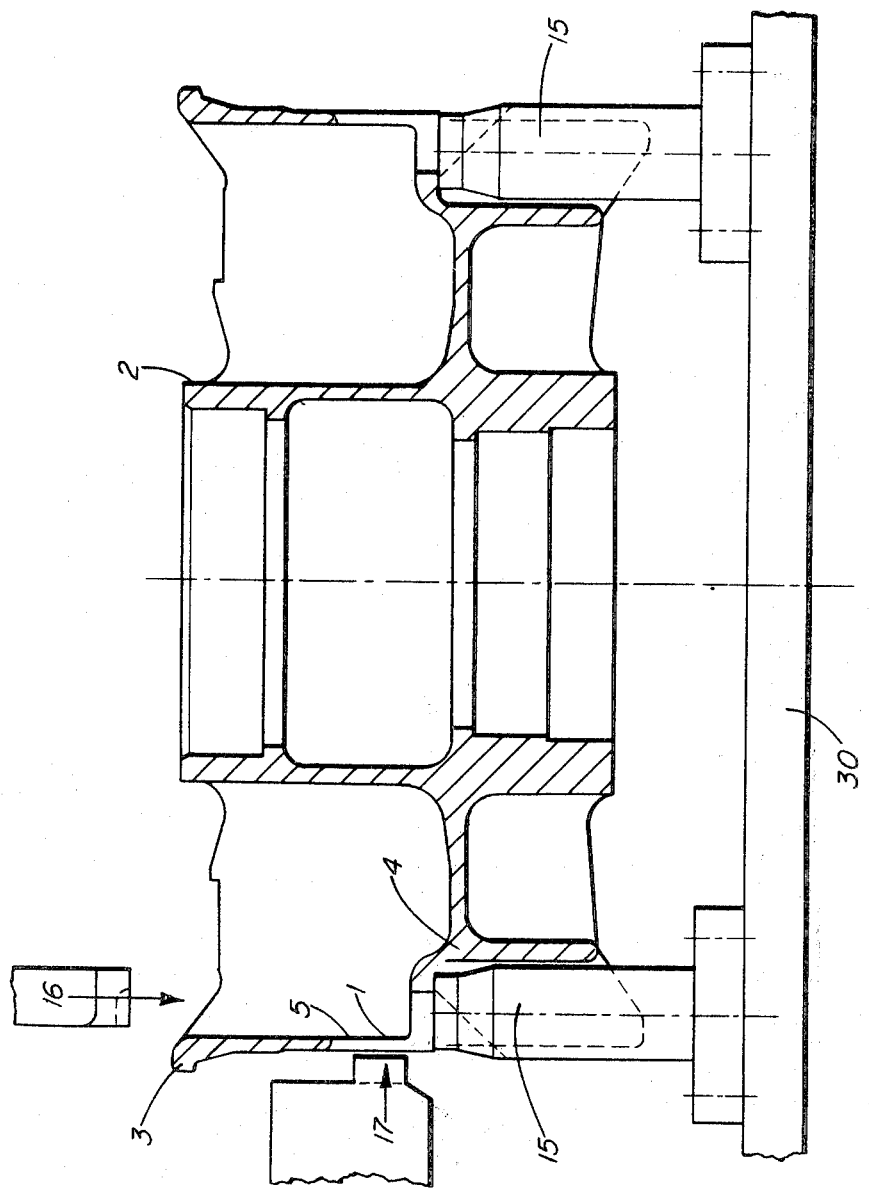
FIG. 8 is a sectional view showing the entire wheel body and its arrangement on the processing apparatus of the invention.

Referring first to FIG. 8, the arrangement of a wheel body 2 on the apparatus of the invention is shown, with the left side of this arrangement being depicted in greater detail in FIGS. 1–6.

Figure 1:
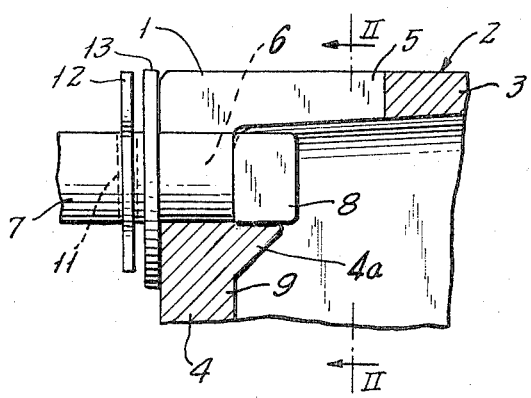
FIG. 1 is a partial radial sectional view taken through a part of the spoke head of the wheel body having an inserted bolt.
Figure 2:
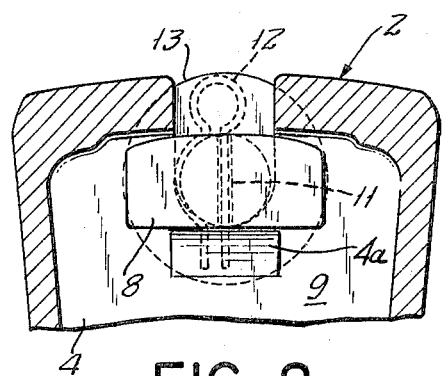
FIG. 2 is a sectional view taken along the line II—II of FIG. 1.

In FIGS. 1 and 2 of the drawings there are shown radial sections taken through an angular slot 1 formed in a portion of the wheel body 2. The slot 1 extends through a supporting wall 3 of the wheel body and through a wall 4 for the bolt and, accordingly, the slot 1 has a first portion 5 and a second 6. A bolt 7 may be inserted into the slot 1 so that a hammer-shaped head 8 of the bolt is inserted to within the wheel body. The hammerhead 8 is formed with a generally rectangular cross section and it is first inserted with its longitudinal side aligned with the slot and it is subsequently turned 90°, as best seen in FIG. 2, and then pulled outwardly of the slot so that the head 8 will bear against the inner surface 9 of the wall 4.

On the side of the head 8, on the inside of wall 4, there can be arranged an integrally cast projection 4a so that the head 8 will be secured against rotation not only by the supporting wall 3 but also by the projection 4a, as indicated in FIG. 1.

Adjacent to the outer surface of the wall 4, the bolt 7 is formed with a radial bore 11 which extends therethrough and which receives a cotter spring or pin 12. A washer 13 is arranged between the wall 4 and the cotter pin 12. The arrangement described prevents the bolt 7, which has been already inserted from externally of the wheel, from being moved inwardly during mounting of a nut thereby making assembly of the wheel easy.

The apparatus for performing the process of the invention and for processing the cast wheel body is illustrated in FIGS. 3–8.

Figure 3:
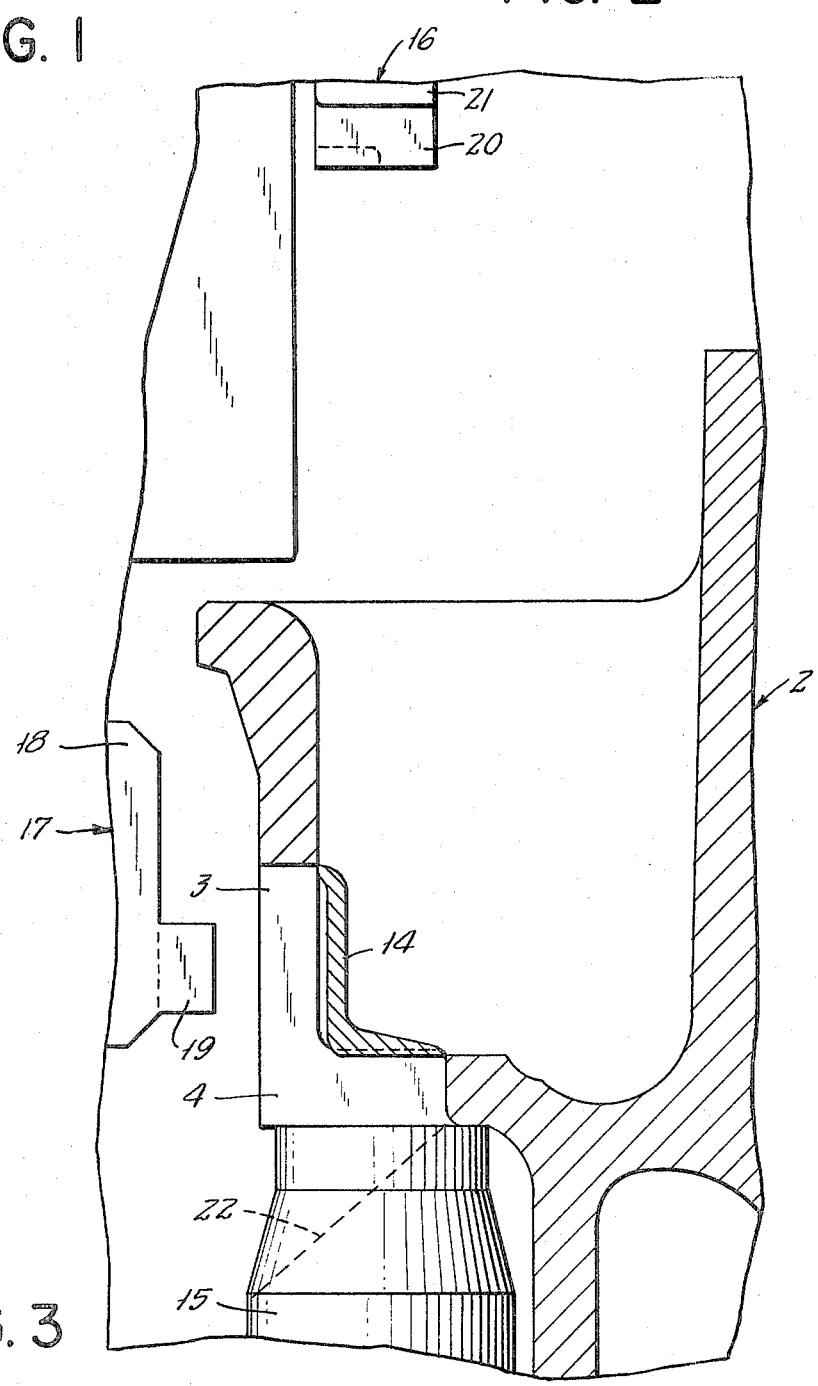
FIG. 3 is a partial vertical sectional view taken through a wheel body placed in the processing apparatus and showing the device prior to commencement of the processing procedure.

In FIG. 3 there is shown a portion of the wheel body 2 shown in its entirety in FIG. 8 which is cast with an angle piece 14. The processing technique of the invention consists in breaking-out of this angle piece and deburring the areas where the angle piece is broken out. Furthermore, the thickness of the wall 4 for the bolt is compressed to a standard size and this thickness is simultaneously checked or measured. If, for any reason, it is found that the wall 4 is too thin, this will be automatically indicated and the wheel body 2 will be rejected.

The wheel body 2 which is to be processed is placed upon a table 30 in such a manner that it will be positioned relative to pin-shaped vertical supports 15 shown in FIG. 8, one of which will be assigned to each of the six or eight spokes of the wheel body, the supports 15 being fastened on the table 30 which is rotatable about a vertical axis. For processing the wheel body 2, the wheel body is placed upon the table 30 which is pulled away from the center of the device, the supports 15 operating to nonrotatably hold the sliding table including the wheel body 2. Subsequently, the sliding table is moved toward the center into a centering device (not shown) with a triangular cutout so that the sliding table is held in the cutout. Subsequently, a tool 16 is lowered almost to the angle piece 14, as shown in FIG. 4. The tool will slide adjacent to the supporting wall 3. When the tool 16 has reached this position, a push member 17 having a front portion 19, which may be formed with a truncated conical shape, will push the wheel body 2 in horizontally toward the tool 16 to align the wheel body 2 radially and relative to the circumference. In doing so, the front portion 19 moves into the slot portion 5 until it touches the supporting wall 3 on both sides.

In order to facilitate the processing, the angle piece 14 is spaced from the slot portion 5 and it is arranged offset in the slot portion 6.

Figure 7:
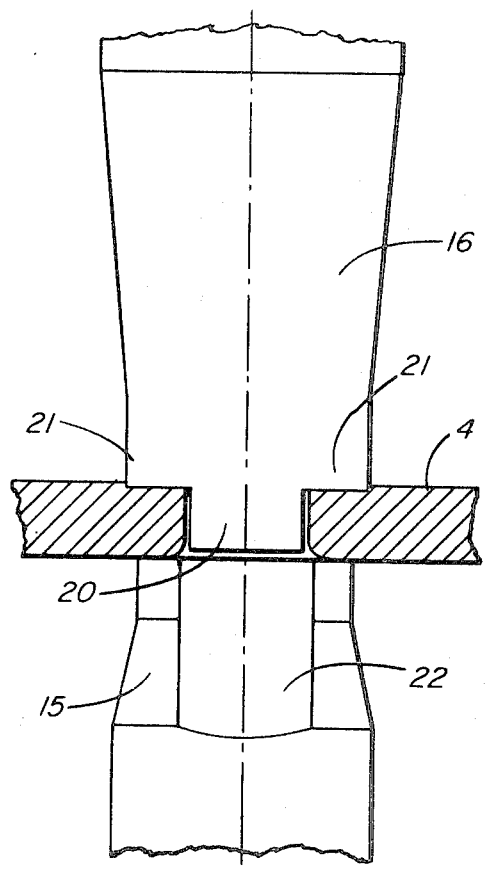
FIG. 7 is a partial sectional view perpendicular to that of FIG. 6 also showing the tool in its fully inserted position.

Subsequently, the actual processing may occur. For this purpose, the tool 16 is further lowered. The tool 16 will break out the angle piece 14, it will deburr the areas where the breaking out occurs on the supporting wall and the wall for the bolt, it will level the bolt support and compress the wall 4 to a predetermined thickness. In order to enable performance of this operation, the tool 16 is constructed in three pieces as seen in FIG. 7. These include a middle portion 20 which is provided with a lateral portion 21 on either side thereof. The middle portion 20 extends further downwardly than the two lateral portions 21 and serves the purpose of breaking-out the angle piece 14 and deburring the wheel body surfaces while the lateral portions 21 operate to level and compress the wall 4 and to determine its thickness in a manner best seen in FIG. 7. If the wall 4 is too thin, this will be indicated so that the wheel body 2 may be rejected.

Each of the supports 15 is provided with an oblique downwardly extending groove 22 so that an angle piece 14 which has been separated from the wheel body may easily slide downwardly through the groove 22 to a container.

After the processing of a spoke head has been concluded, the tool 16 is moved upwardly into its initial position and the sliding table may be retracted, it can be rotated through an angle of for example 60° (for a wheel body with six spokes) and it can again be moved inwardly for processing of the next spoke head. This procedure is repeated until all spoke heads are processed.

In the region of the first slot portion 5, the angle piece is located outside of this portion in the direction toward the center of the wheel and it extends into the second slot portion 6. This arrangement facilitates breaking out and deburring the parts. Furthermore, the formation of burrs in the slot is prevented so that the deburring operation is simplified. In addition, fragments are prevented from being placed on the bolt support and becoming subsequently pressed into the bolt support, since this would result in a reduction of the strength of the wheel body.

For the wheel body treated with the present invention, it is preferred that cast iron with nodular graphite be used since this has proven quite useful for the manufacture of wheels. Products of materials such as GGG 42 (GG=grey cast iron) have proven especially useful.

In comparison with previous embodiments, the embodiment of the present invention renders the production of these items simpler in many ways while simultaneously improving the quality of the manufactured product while reducing the number of rejects.

Heretofore, bolt supports which were found to be too thick or uneven were ground down, which involved significant difficulties. In the present procedure, on the other hand, the actual processing may occur automatically and an automatic approach is preferred.

While a specific embodiment of the invention has been shown and described in detail to illustrate the application of the inventive principles, it will be understood that the invention may be embodied otherwise without departing from such principles.

What is claimed is:

1. A method for producing a wheel body of iron/carbon cast material, said wheel body consisting of a central axis of rotation and of spoke heads arranged in a distributed manner circumferentially around said axis with supports arranged therein for hammerhead bolts which are used to fasten a rim on said wheel body, said bolts being inserted from outside said wheel body through an angular slot for said bolts which extends through a wall for said bolt and through a supporting wall for the head of said bolt defined by the wheel body, which supporting wall extends generally parallel to said axis and approximately perpendicularly relative to said wall for said bolt, said bolts when tightened being nonrotatably held against said wall for said bolt, said method comprising the steps of: casting said slot in said wheel body with an angle piece which may be pushed outwardly and arranging said wheel body with said axis arranged in a generally vertical orientation in apparatus including a movable tool which is movable vertically in a direction generally parallel to said axis with said angle piece being arranged within the path of movement of said vertically movable tool; placing said wheel body for processing horizontally on a rotatable sliding table having pin-shaped vertical supports provided in a number and arrangement corresponding with the number and arrangement of said spoke heads; moving said sliding table toward a stationary centering device and subsequently lowering said vertically movable tool adjacent said supporting wall almost to the level of said angle piece; applying a horizontally movable push member against said wheel body in a direction extending generally radially relative to said axis to move said wheel body toward said tool and moving said tool further downwardly in a direction generally parallel to said axis in order to, first, break out said angle piece, secondly, deburr said wall for said bolt and, thirdly, calibrate said wall to a specified thickness; and thereafter moving said tool out of said wheel body, retracting said sliding table, rotating said sliding table to a subsequent spoke head and again inserting said tool to process a subsequent spoke head.

2. A method according to claim 1 wherein said slot is formed with a first portion extending generally parallel to said axis and a second portion extending generally perpendicularly to said first portion and wherein said angle piece is formed with a generally right-angled configuration and includes a portion which extends approximately parallel to said supporting wall and is offset in the direction toward the interior of said wheel, and a portion of said angle piece which extends approximately parallel to said wall for said bolt and is arranged sunk in said second slot portion.

3. Apparatus for producing a wheel body of iron/carbon cast material, said wheel body consisting of a central axis of rotation and spoke heads arranged in a distributed matter circumferentially around said axis with supports arranged therein for hammerhead bolts which are used to fasten a felly of said wheel body, said bolts being inserted from outside said wheel through an angular slot for said bolts which extends through a wall for said bolt and through a supporting wall for the head of said bolt each defined by said wheel body, which supporting wall extends generally parallel to said axis and approximately perpendicularly relative to said wall for said bolt, said bolts when tightened being nonrotatably held against said wall for said bolt, said wheel body having a slot formed therein by casting of said wheel body with an angle piece arranged so that it may be pushed outwardly, said apparatus comprising: a vertically movable tool adapted to have said angle piece arranged within the path of movement of said vertically movable tool; a rotatable sliding table having pin-shaped vertical supports provided in number and arrangement to correspond with said spoke heads of said wheel body and adapted to have said wheel body placed thereon with said central axis extending in a generally vertical direction and with said vertical supports spaced circumferentially about said vertical axis to support said spoke heads during processing of said wheel body; a stationary centering device adapted to have said sliding table moved thereto, said vertically movable tool being lowerable parallel to said axis adjacent said supporting wall of said wheel body almost to the level of said angle piece after said sliding table is moved toward said stationary centering device; a horizontally movable push member adapted to be moved radially relative to said axis against said wheel body to move said wheel body toward said tool, said tool being operative to be moved further downwardly in order to, first, break out said angle piece, secondly, deburr said wall for said bolt and, thirdly, calibrate said wall to a specified thickness; said apparatus subsequently operating by moving said tool out of said wheel body, retracting said sliding table, rotating said sliding table about said axis to a subsequent bolt head and then again inserting said tool to process a subsequent spoke head.

4. Apparatus according to claim 3 wherein said push member is provided with an outwardly tapering front portion adapted to engage said slot in said supporting wall in order to align said wheel body with said tool radially and relative to the circumferential direction.

* * * * *